US006702321B2

United States Patent
Thoma

(10) Patent No.: US 6,702,321 B2
(45) Date of Patent: Mar. 9, 2004

(54) SYSTEM FOR CONTROLLING A MOTORCYCLE AIR BAG

(75) Inventor: Rainer Thoma, Voehringen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/853,628

(22) Filed: May 14, 2001

(65) Prior Publication Data

US 2001/0042973 A1 Nov. 22, 2001

(30) Foreign Application Priority Data

May 19, 2000 (DE) ......................................... 100 24 818

(51) Int. Cl.⁷ ............................................. B60R 21/22
(52) U.S. Cl. ..................................... 280/730.1; 280/735
(58) Field of Search ..................... 280/728.1, 730.1, 280/735

(56) References Cited

U.S. PATENT DOCUMENTS

| 3,930,667 | A | * | 1/1976 | Osuchowski et al. ...... 2/DIG. 3 |
| 5,071,160 | A | * | 12/1991 | White et al. ................ 180/268 |
| 5,330,226 | A | | 7/1994 | Gentry et al. ................ 280/735 |
| 5,737,083 | A | * | 4/1998 | Owechko et al. ....... 250/559.22 |
| 5,938,231 | A | | 8/1999 | Yamazaki ................. 280/730.1 |
| 6,252,240 | B1 | * | 6/2001 | Gillis et al. .................. 250/221 |
| 6,275,146 | B1 | * | 8/2001 | Kithil et al. ................. 180/272 |
| 6,290,255 | B1 | * | 9/2001 | Stanley et al. .............. 180/271 |
| 6,313,739 | B1 | * | 11/2001 | Roth et al. ................... 180/273 |

FOREIGN PATENT DOCUMENTS

| DE | 4112579 A1 | 10/1991 |
| DE | 4023109 A1 | 1/1992 |
| DE | 19637108 A1 | 3/1998 |
| DE | 19822850 A1 | 11/1998 |
| DE | 19728130 A1 | 1/1999 |
| DE | 19754541 A1 | 6/1999 |
| DE | 19826662 A1 | 12/1999 |

* cited by examiner

Primary Examiner—Eric Culbreth
Assistant Examiner—Toan C To
(74) Attorney, Agent, or Firm—Crowell & Moring LLP

(57) ABSTRACT

In the case of a system for controlling a motorcycle air bag with respect to the sitting position of a motorcycle occupant, a distance measuring device measures the distance of the motorcycle occupant with respect to the motorcycle, and an adaptation device controls a motorcycle air bag corresponding to this distance.

10 Claims, 1 Drawing Sheet

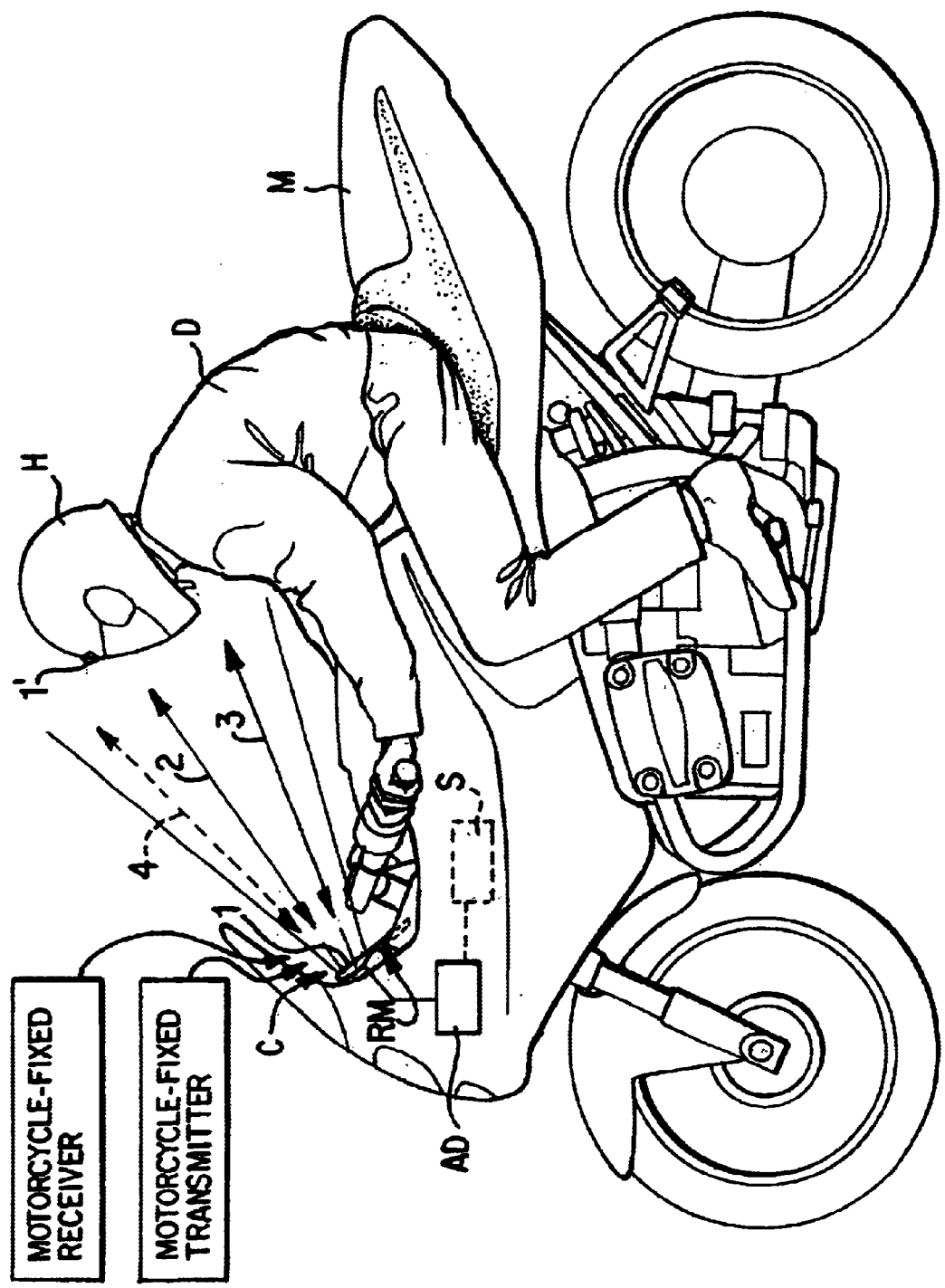

SYSTEM FOR CONTROLLING A MOTORCYCLE AIR BAG

BACKGROUND AND SUMMARY OF THE DISCLOSURE

This application claims the priority of German Patent Document 100 24 818.7, filed in Germany, May 19, 2000, the disclosure of which is expressly incorporated by reference herein.

The invention relates to a system for controlling a motorcycle air bag.

It is known to provide an air bag for a motorcycle occupant in order to protect him, if required, from serious injury (German Patent Document DE 19720622 A—corresponding U.S. Pat. No. 5,938,231). However, the problem arises in this case that, when the occupant is unfavorably positioned, the inflating of the air bag may cause injury or even separate the occupant from the motorcycle.

It is an object of the invention to provide a system of the initially mentioned type in the case of which the described problem is at least reduced.

The invention achieves this object by providing a system for controlling a motorcycle air bag with respect to the sitting position of a motorcycle occupant, comprising a distance measuring device for measuring the distance of a motorcycle occupant with respect to the motorcycle, and an adaptation device for controlling a motorcycle air bag corresponding to said distance. At any time, the distance measuring device clearly supplies information concerning the motorcycle occupant's momentary position. As a function of this position and particularly of the distance between the motorcycle and the motorcycle occupant, the controlling of the air bag takes place. As a result, injuries can be excluded during the inflating operation.

From U.S. Pat. No. 5,330,226, a seat occupation detecting system for a passenger car is known, in which an infrared sensor is arranged above the vehicle seat in the vehicle ceiling. The infrared sensor has a plurality of fields of view by means of which the relative position of a vehicle occupant with respect to the air bag is determined, so that the air bag can be correspondingly controlled during the triggering without injuring the occupant.

Further, an occupant detection system for passenger cars is known from German Patent Document DE 40 23 109, in which sensors are arranged in the steering wheel, the sun screen, the headrest and the ceiling. All these known systems have the disadvantage that, because of the arrangement above the occupant, it cannot be detected whether the occupant is bending forward and, for example, a back or shoulder region instead of the chest region is sensed.

Advantageous further developments of the invention have the object of determining the position of the motorcycle occupant from the front.

Further features of preferred embodiments are described herein and in the claims.

BRIEF DESCRIPTION OF THE DRAWINGS

The single drawing FIGURE is a lateral schematic view of a motorcycle with a passenger and a system arranged according to the preferred embodiments of the invention.

DETAILED DESCRIPTION OF THE DRAWING

A distance measuring device 1 is provided on a motorcycle M as part of an instrument cluster C and emits in a fan-shape several infrared or ultrasound rays 2, 3 in a direction of a motorcycle driver D and receives the two reflected rays. Because of the arrangement in the instrument cluster C, two rays 2 and 3 are sufficient which are aimed at the head and the upper body of the motorcycle occupant, in order to obtain information concerning his position.

This information includes an indication of the distance of the respective object (head or upper body) from the mounting site of the distance measuring device 1. Also when the motorcycle occupant is bending forward, the orientation of the object with respect to the system 1 is maintained.

Instead of only two rays, 2, 3, further rays 4 can be emitted and received. This increases the precision of the distance-related data. The automatic adaptation of the entire system to the different body sizes of the motorcycle driver also remains good. Smaller drivers sit closer to the system 1. Their heads are also lower and can virtually always be detected by the upper ray.

The motorcycle driver's position can also be determined by a camera according to certain preferred embodiments of the invention. In especially preferred embodiments, the camera is disposed at the instrument cluster and faces the occupant's head. This also results in the advantage of being able to reliably detect the position of drivers of different sizes by means of an unchanged alignment of the camera. The distance is obtained by means of conventional autofocusing techniques.

According to certain preferred embodiments the distance measuring device transmitter is mounted on one or more rear view mirrors (RM shown in dashed lines) of the motorcycle.

According to certain preferred embodiments the distance measuring device transmitter 1' is carried by the occupant helmet H.

In all embodiments rays transmitted by the transmitter 1, 1' are reflected from the facing motorcycles occupant or structure and a distance of the occupant from the motorcycle fixed structure is detected and a distance signal is generated which is processed by an adaptation device AD to control an air bag inflation system S.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. System for controlling a motorcycle air bag with respect to a sitting position of a motorcycle occupant, comprising:
    a distance measuring device for measuring a distance of a motorcycle occupant with respect to the motorcycle, and
    an adaptation device for controlling a motorcycle air bag corresponding to said distance wherein, the distance measuring device includes a transmitter adapted to be arranged at a motorcycle occupant's helmet and a motorcycle-fixed receiver for the signal emitted by the transmitter.

2. System according to claim 1,
    wherein the distance measuring device is operable to determine the distance of a motorcycle-fixed point with respect to a given point on an exterior side of the motorcycle occupant.

3. System according to claim 1, wherein the distance measuring device determines a contour of the motorcycle occupant.

4. System according to claim 1, wherein the distance measuring device is arranged in an instrument cluster of the motorcycle.

5. System according to claim 1, wherein the distance measuring device is arranged in a rear view mirror of the motorcycle.

6. System according to claim 1, wherein the distance measuring device operates on the basis of ultrasound.

7. System according to claim 2, wherein the distance measuring device operates on the basis of ultrasound.

8. System according to claim 3, wherein the distance measuring device operates on the basis of ultrasound.

9. System according to claim 4, wherein the distance measuring device operates on the basis of ultrasound.

10. System according to claim 5, wherein the distance measuring device operates on the basis of ultrasound.

* * * * *